March 3, 1942.  R. M. HARDGROVE  2,275,394
PULVERIZED FUEL BURNING APPARATUS
Filed April 29, 1938   4 Sheets-Sheet 1
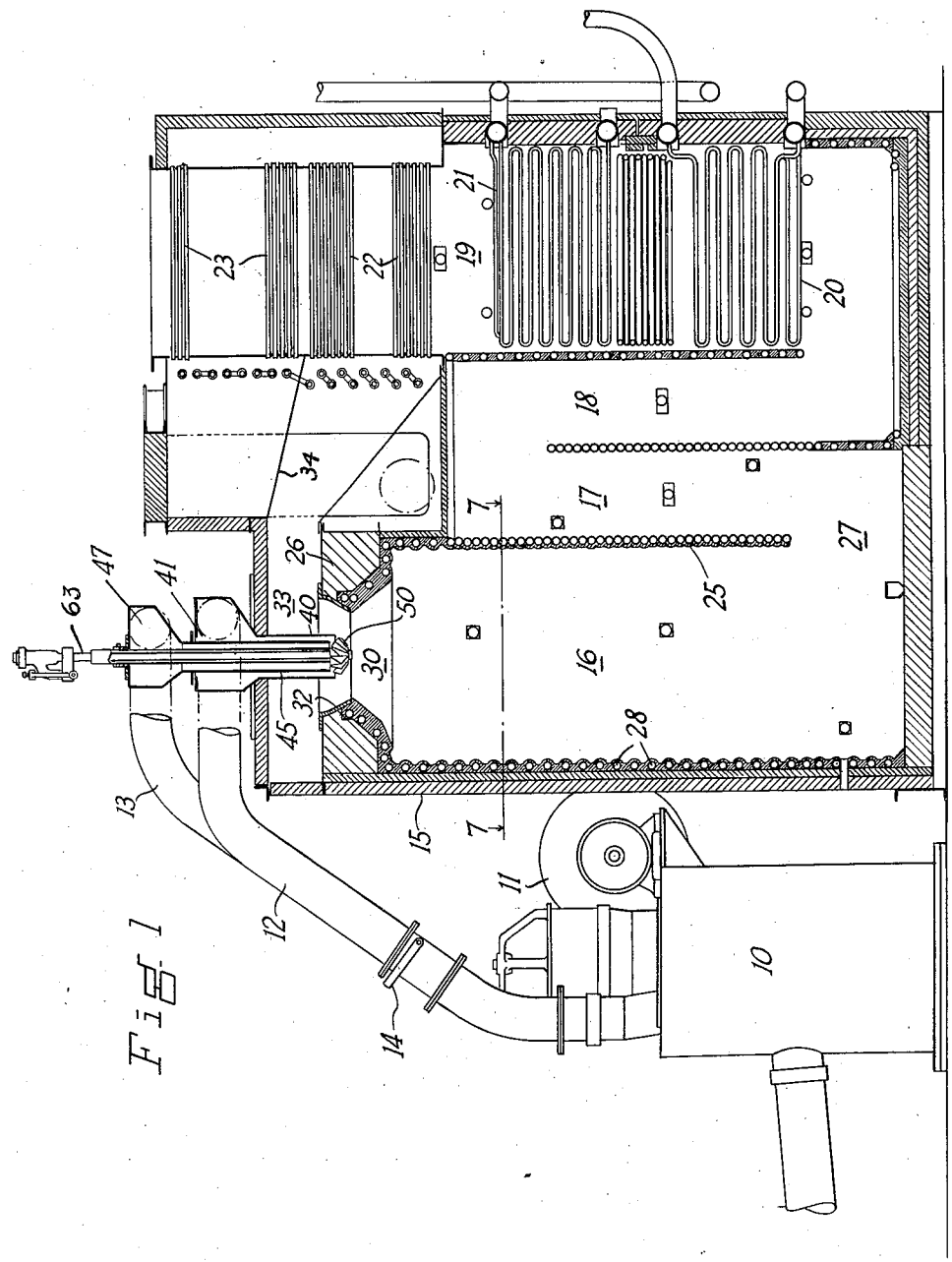
INVENTOR.
Ralph M. Hardgrove
BY
ATTORNEY.

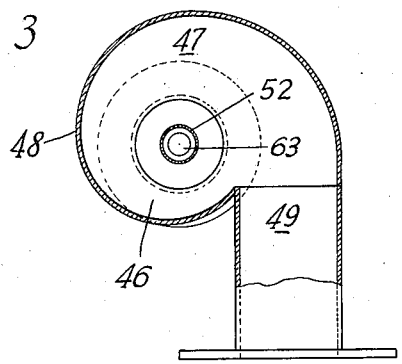
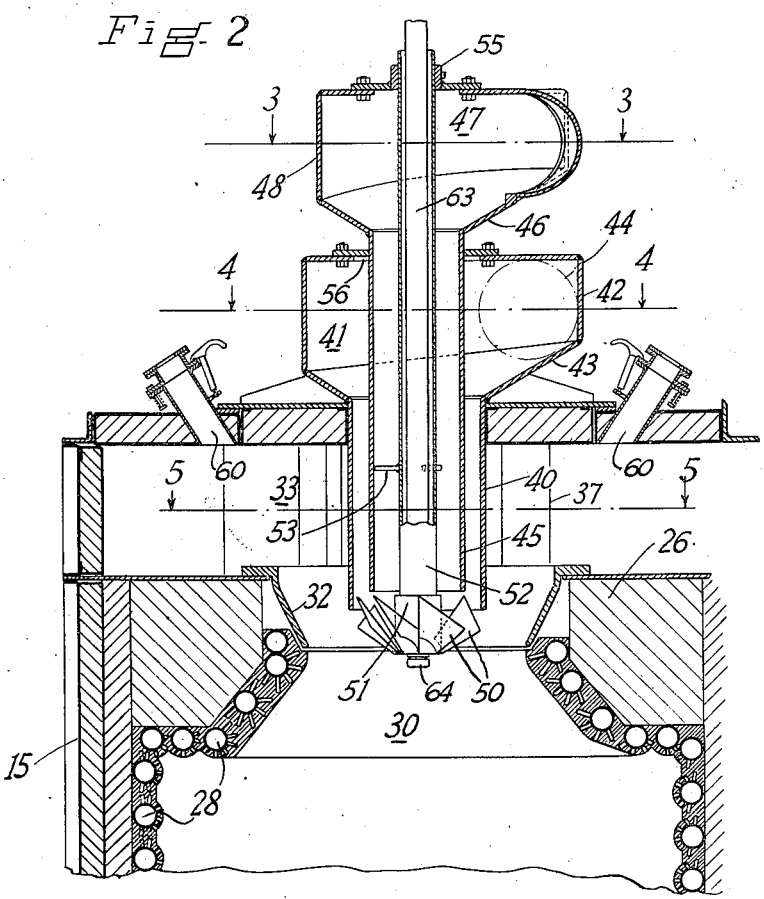

March 3, 1942.      R. M. HARDGROVE      2,275,394
PULVERIZED FUEL BURNING APPARATUS
Filed April 29, 1938      4 Sheets-Sheet 3

INVENTOR.
Ralph M. Hardgrove
BY
ATTORNEY.

March 3, 1942.   R. M. HARDGROVE   2,275,394
PULVERIZED FUEL BURNING APPARATUS
Filed April 29, 1938   4 Sheets-Sheet 4
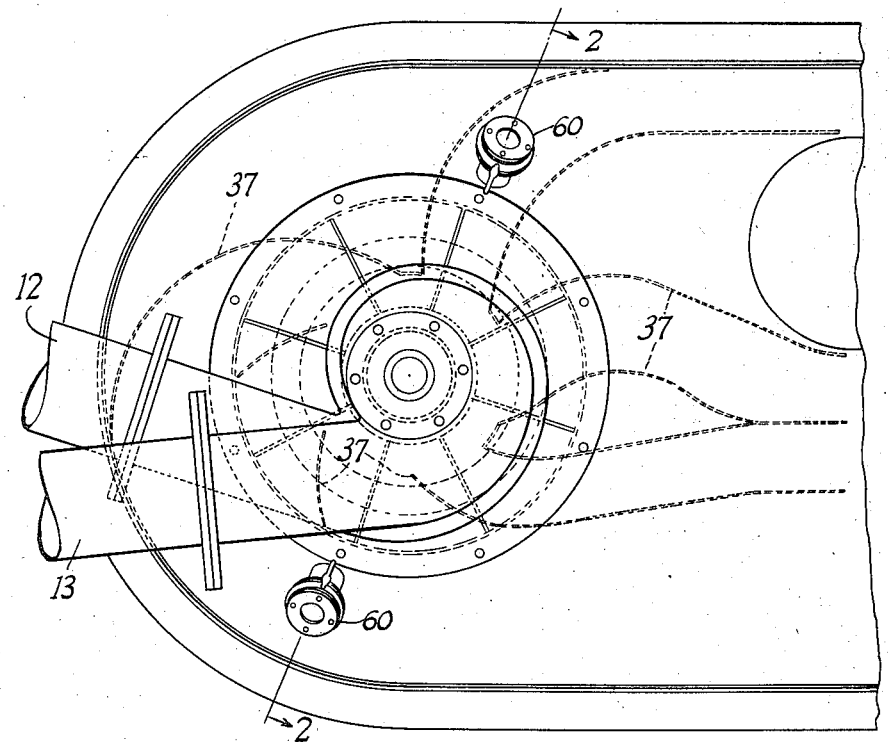
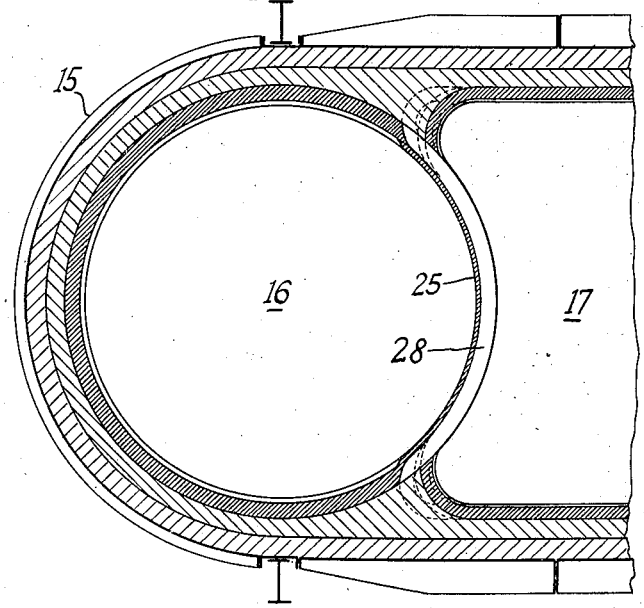
INVENTOR.
Ralph M. Hardgrove
BY
ATTORNEY.

Patented Mar. 3, 1942

2,275,394

UNITED STATES PATENT OFFICE 2,275,394

PULVERIZED FUEL BURNING APPARATUS

Ralph M. Hardgrove, Westfield, N. J., assignor to The Babcock & Wilcox Company, Newark, N. J., a corporation of New Jersey Application April 29, 1938, Serial No. 204,935

18 Claims. (Cl. 110—28)

This invention relates to improvements in the construction and operation of apparatus for burning pulverized fuel, and more particularly, apparatus for effectively burning pulverized fuel over a wide operating range with a minimum of excess air and at high rates of heat liberation per cubic foot of furnace space.

In accordance with my invention pulverized fuel and primary air are delivered to a furnace chamber by pulverized fuel burner provisions, in a circumferentially uniformly distributed whirling stream intimately mixed with a stream of circumferentially uniformly distributed secondary air on entering a circular furnace chamber burner port, and burned at a high rate of heat liberation over a wide range of load. The fuel burner provisions employed are of a simple compact design and relatively low cost of construction, yet capable of maintaining the desired type of fuel discharge and high combustion effectiveness over a wide range of operation. A special wind box construction cooperates with the fuel burner provisions to maintain a circumferentially uniform delivery of secondary air around the fuel stream. The mixing of the pulverized fuel and secondary combustion air is accelerated by special provisions for distributing the entering fuel particles proportionately through the secondary air stream. The rate of ignition and combustion of the fuel is also accelerated by an advantageous arrangement of the fuel burner provisions relative to the furnace chamber and an improved furnace chamber internal wall shape and construction.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is an elevation, partly in section, of a steam generating unit incorporating my invention;

Fig. 2 is an enlarged sectional view of a portion of the apparatus shown in Fig. 1 taken on the line 2—2 of Fig. 6;

Figure 4:
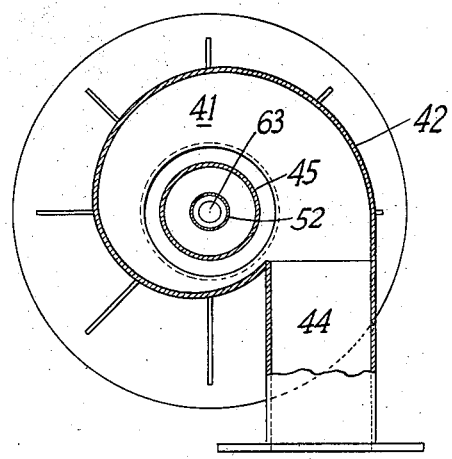
Figure 5:
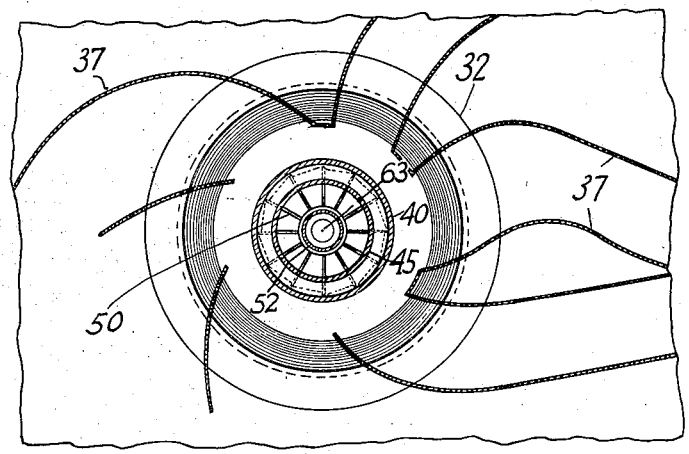

Figs. 3, 4, and 5 are horizontal sections taken on the lines 3—3, 4—4, and 5—5, respectively of Fig. 2;

Fig. 6 is a plan view of the apparatus shown in Fig. 2; and

Fig. 7 is a horizontal section taken on the line 7—7 of Fig. 1.

The steam generating unit illustrated comprises a pulverizer 10 to which the solid fuel, preferably bituminous coal, is supplied in accordance with the steam load. The pulverized fuel is removed from the pulverizer by a current of carrier air supplied from a forced draft fan 11. The coal-laden air passes out of the top of the pulverizer through a pair of fuel supply pipes 12 and 13, each of which has incorporated therein a suitable cut-off valve 14. The fuel pipes 12 and 13 are directly connected to the fuel burning apparatus of a steam generator 15, which as shown in Figs. 1 and 6, has a setting of horizontal elongated cross-section divided into a furnace chamber 16, an open pass 17, a second open pass 18, and a convection pass 19, all serially connected. The furnace chamber 16 and open passes 17 and 18 are completely water cooled and unobstructed, while the convection pass 19 contains the convection heated tubular heating surface of the generator including a steam superheater 20, a superjacent economizer 21, and air heater sections 22 and 23. The steam generator illustrated is disclosed in greater detail in a pending application of Ervin G. Bailey, Serial No. 113,060, filed Nov. 27, 1936.

The furnace chamber 16 is preferably made vertically elongated and of cylindrical cross-section. The furnace chamber is separated from the first open pass 17 by a curved wall section or partition 25 extending from the furnace chamber roof 26 to a point adjacent to but terminating short of the floor to provide a gas outlet 27 therebelow to the first open pass 17. The furnace chamber is fluid cooled by a steam generating continuous tube coil 28, formed of relatively small diameter tubing having metallic studs welded thereon and covered with initially plastic chrome ore refractory to form a refractory faced cylindrical shaped wall adapted to withstand high temperature conditions in the furnace chamber.

The portion of the tube coil and refractory in the top wall of the furnace is arranged to form a downwardly flaring burner port 30 of circular cross-section arranged coaxially with the furnace chamber inner wall. An inverted frusto-conical burner ring 32 is positioned within the restricted upper end of the burner port 30 and provided with a flanged upper end carried by the furnace chamber top wall, forming an upwardly flaring continuation of the burner port. The portion of the setting above the furnace chamber roof 26 is used as an air chamber or wind box 33 having a flaring conduit 34 connecting it to the air heater section 22. A series of angularly spaced curved vanes or partitions 37, as shown in Figs. 5 and 6, are so shaped and non-symmetrically arranged in the wind box about the upper end of the burner port ring 32 as to effect a substantially uniform distribution circumferentially of the burner port of the air entering the wind box with a minimum pressure drop between the side inlet and any part of the burner port circumference. The illustrated construction of the air chamber partitions causes the annular stream of secondary air flowing downwardly through the burner port to have a rotation in a clockwise direction. The partitions are curved outwardly from the burner port on progressively different arcs and with the outer ends of adjacent partitions relatively spaced laterally to conduct amounts of incoming air proportional to the extent of the burner port circumference at the port end of the air passages formed between the adjacent partitions. As shown in Fig. 6, the back portion of the burner port has several short curved partitions forming circumferentially adjacent entrance passages, all receiving incoming air from a common supply passage.

In accordance with my invention a pulverized fuel burner of the duplex type is mounted on and projects through the wind box 33 so as to discharge through the burner port 30. The fuel burner comprises a vertically arranged cylindrical nozzle 40 projecting through the top wall of the wind box to a level about midway of the burner port ring, i. e., slightly above the burner port throat. The upper end of the nozzle 40 is connected to a fuel inlet chamber 41 having a volute-curved peripheral wall 42, an inverted conical bottom section 43 forming a continuation of its lower edge to the nozzle 40, and a tangentially arranged fuel inlet opening 44 to which the fuel pipe 12 is connected. A second cylindrical fuel nozzle 45 is mounted on and projects through the top wall of the inlet chamber 41 within and terminating short of the lower end of the nozzle 40. The upper end of the inner fuel nozzle 45 is also connected to an inverted conical bottom 46 of a second fuel inlet chamber 47 having a volute-curved peripheral wall 48 and a tangentially arranged fuel inlet 49 to which the fuel pipe 13 is connected at a position slightly offset angularly relative to the lower fuel inlet 44.

With the described construction of the pulverized fuel burners and fuel supply connections, a stream of pulverized fuel and primary air can be delivered to the furnace chamber through either or both of the nozzles 45 or 40. The inner burner nozzle can supply a stream of fuel and air whirling in a counterclockwise direction, while the outer burner nozzle can supply a second stream of pulverized fuel and primary air through the annular passage defined by the nozzles 45 and 40 which is also whirling in a counterclockwise direction. With either or both fuel nozzles in use, the described wind box construction will provide a stream of secondary air with a clockwise rotation flowing downwardly through the circular burner port 30. The secondary air stream will have its maximum velocity at the port throat. The tapered approach to the throat provides the maximum air velocity for a given pressure drop across the port. As the counterclockwise rotating stream of pulverized fuel and primary air from either nozzle reaches the discharge end thereof, the fuel particles become free to move radially outward into the stream of secondary air in proportion to the centrifugal effect thereon, so that the larger particles tend to mix with the secondary air while the smaller particles, which have a smaller centrifugal effect, tend to remain in the primary air stream. The introduction of the larger fuel particles into an oppositely rotating secondary air stream at its point of maximum velocity tends to limit the radial outward movement of the fuel particles and prevent their concentration along the sides of the burner port.

The multiple concentric fuel nozzle arrangement is especially advantageous for wide range operation as it tends to maintain a more uniform mixing with the secondary air over the entire range than would be possible with a single nozzle, because the angular velocity of the fuel particles increases as the radius of the nozzle decreases for a given cross-sectional flow area. With a single nozzle of sufficient diameter to deliver the maximum fuel supply, the angular velocity of the fuel particles would be undesirably low at low loads.

It has been found that mixing of the air and fuel streams is considerably enhanced by the use of a bladed impeller at the lower or discharge end of the fuel nozzles. The impeller is of a well known type comprising a series of deflecting blades 50 mounted on a collar 51 on the lower end of a hollow impeller adjusting rod 52 extending coaxially of the fuel nozzle 45 and positioned therein by spacer members 53. The blades 50 are obliquely arranged relative to the axis of the rod 52. The upper end of the rod 52 extends through the top wall of the upper burner inlet chamber and is held in position thereon by an adjustable collar 55 permitting vertical adjustment of the impeller relative to the discharge ends of the fuel nozzles. I have found it especially advantageous to employ an impeller having its blades 50 extending beyond the circumference of the inner fuel nozzle 45 with the outer edge of the blades having only sufficient clearance relative to the inner periphery of the outer fuel nozzle 40 to permit the impeller to be withdrawn along with the inner nozzle through the outer nozzle. A covered opening 56 in the top wall of the lower fuel inlet chamber 41 is made of sufficient diameter to permit such withdrawal of the impeller. With the described construction and arrangement, the impeller will be effective with either or both of the fuel nozzles in use.

Peep holes 60 are angularly arranged in the top wall of the wind box to permit a view of the furnace chamber through the burner port ring 32. The upper end of the hollow impeller adjusting rod 52 is provided with a removable cap to permit the insertion of an oil burner barrel 63 through the adjusting rod with its discharge end 64 projecting slightly below the lower end of the impeller.

In the light and normal load portions of the desired operating range of the steam generating unit, it has been found preferable to operate with the inner burner nozzle 45 alone. Under these conditions an annular counter-clockwise rotating stream of pulverized fuel and primary air is discharged from the lower end of the nozzle. The tendency of the fuel particles to move radially outward on being discharged is limited by the projecting portion of the outer nozzle to the area in which the bladed impeller is effective. The described arrangement of the fuel burners and furnace chamber obviate any tendency for the gravitational effect to cause unequal distribution of the fuel particles in different segmental portions of the discharging fuel streams. Ignition of the combustible mixture is expedited by the refractory faced port and chamber walls and combustion proceeds at a rapid rate as the whirling fuel and air mixture moves downwardly through the furnace chamber. Effective combustion conditions have been continuously maintained over a seven to one load range with the inner burner nozzle alone in use.

For example, a steam load of 17,000 lbs. per hr. was continuously maintained on a forced circulation boiler of the character illustrated for an extensive period with only the inner burner in use. Effective combustion conditions were maintained during this period with less than 20% excess air and a combustion rate of approximately 450,000 B. t. u. per cu. ft. of furnace volume per hr.

As the steam load increases above the point at which the fuel supply can be efficiently handled by the inner burner the valve 14 in the pipe 12 is opened to permit part of the pulverizer output to be delivered to the outer burner. With both burner nozzles in use, the whirling annular streams of fuel and primary air tend to mix before mixing with the entering secondary air. It has been found economically desirable to use the inner burner alone up to about 80% of the maximum load and to employ both burners at higher loads. With both burners in use the pulverized fuel output of the pulverizer will be equally divided between both burners in as much as the flow areas throughout the two conduit systems and burners are substantially identical. It has been found that even with both burners in use combustion proceeds at such a rapid rate that combustion is practically completed before the gases leave the furnace chamber. The incombustible constituents of the fuel tend to separate from the burning fuel stream in a molten condition and collect as slag on the inner wall of the furnace chamber. With the high rates of heat release normally maintained, the collected slag will remain molten and flow down the walls and be removed from the bottom of the furnace. Any slag particles leaving the furnace chamber in suspension are solidified in the open passes so that the superheater and economizer tubes can be kept clean without undue effort.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Pulverized fuel burning apparatus comprising in combination means defining a furnace chamber of cylindrical internal cross-section having a concentric burner port in one end and a heating gas outlet adjacent its opposite end, an inwardly tapering frusto-conical burner ring concentrically arranged in said burner port, a pulverized fuel burner comprising a cylindrical fuel nozzle concentric with said burner ring, an inlet chamber having a volute-curved peripheral wall and a restricted circular outlet connected to the inlet end of said fuel nozzle, a pulverized fuel inlet tangentially connected to said inlet chamber, a wind box surrounding said fuel nozzle and opening to said burner ring, an air inlet to said wind box at one side only of said fuel burner, a series of angularly spaced fixed partitions in said wind box around said fuel nozzle and relatively spaced circumferentially of and progressively curved outwardly from said burner ring to substantially uniformly distribute the entering air circumferentially relative to said burner ring, and a bladed impeller at the discharge end of said fuel nozzle and having a circular series of oblique blades extending substantially throughout the discharge area of said fuel nozzle.

2. Apparatus for burning pulverized fuel at high rates of heat release comprising in combination means defining a vertically arranged furnace chamber of cylindrical internal cross-section having a concentric burner port in its upper end and a heating gas outlet adjacent its lower end, the diameter of the lower end of said burner port being at least one-third the diameter of the subjacent portion of said furnace chamber, a pulverized fuel burner comprising a vertically arranged fuel nozzle having its lower end concentric with said burner port, an inlet chamber having a volute-curved peripheral wall and a circular bottom outlet connected to the upper end of said fuel nozzle, a pulverized fuel inlet tangentially connected to said inlet chamber, and a wind box surrounding said fuel nozzle and opening to the upper end of said burner port.

3. Apparatus for burning pulverized fuel at high rates of heat release comprising in combination means defining a vertically arranged furnace chamber of cylindrical internal cross-section having a concentric burner port in its upper end and a heating gas outlet adjacent its lower end, a downwardly tapering frusto-conical burner ring concentrically arranged in said burner port, a pulverized fuel burner comprising a vertically arranged cylindrical fuel nozzle concentric with said burner ring, an inlet chamber having a volute-curved peripheral wall and a restricted circular bottom outlet connected to the upper end of said fuel nozzle, a pulverized fuel inlet tangentially connected to said inlet chamber, a wind box surrounding said fuel nozzle and opening to said burner ring, an air inlet to said wind box at one side only of said fuel burner, and a series of fixed angularly spaced progressively curved vertical partitions in said wind box around said fuel nozzle and arranged to substantially uniformly distribute the entering air circumferentially relative to said burner ring.

4. Apparatus for burning pulverized fuel at high rates of heat release comprising in combination means defining a vertically arranged furnace chamber of cylindrical internal cross-section having a concentric burner port in its upper end and a heating gas outlet adjacent its lower end, a downwardly tapering frusto-conical burner ring concentrically arranged in said burner port, a pulverized fuel burner comprising a vertically arranged cylindrical fuel nozzle concentric with said burner ring, an inlet chamber having a volute-curved peripheral wall and a restricted circular bottom outlet connected to the upper end of said fuel nozzle, a pulverized fuel inlet tangentially connected to said inlet chamber, a wind box surrounding said fuel nozzle and opening to said burner ring, an air inlet to said wind box at one side only of said fuel burner, a series of fixed angularly spaced progressively curved vertical partitions in said wind box around said fuel nozzle and arranged to substantially uniformly distribute the entering air circumferentially relative to said burner ring, and a bladed impeller at the lower end of said fuel nozzle and having a circular series of oblique blades extending substantially throughout the discharge area of said fuel nozzle.

5. Pulverized fuel burning apparatus comprising in combination means defining a furnace chamber having a burner port, a pulverized fuel burner comprising an inner fuel nozzle having its discharge end concentric with said burner port, a fuel inlet chamber having a volute-curved peripheral wall and a circular outlet connected to said fuel nozzle, a pulverized fuel inlet tangentially connected to said inlet chamber, an outer fuel nozzle having its discharge end concentric with and radially spaced from said inner nozzle and having its discharge end extending into said burner port around said inner nozzle, a second fuel inlet chamber having a volute-curved peripheral wall and a circular outlet connected to said outer fuel nozzle, a pulverized fuel inlet tangentially connected to said second inlet chamber, and a wind box surrounding said fuel nozzles and opening to said burner port.

6. Pulverized fuel burning apparatus comprising in combination means defining a furnace chamber having a burner port, a pulverized fuel burner comprising an inner fuel nozzle having its discharge end concentric with said burner port, a fuel inlet chamber having a volute-curved peripheral wall and a circular outlet connected to said fuel nozzle, a pulverized fuel inlet tangentially connected to said inlet chamber, an outer fuel nozzle having its discharge end concentric with and radially spaced from said inner nozzle and having its discharge end extending into said burner port beyond said inner nozzle, a second fuel inlet chamber having a volute-curved peripheral wall and a circular outlet connected to said outer fuel nozzle, a pulverized fuel inlet tangentially connected to said second inlet chamber, a wind box surrounding said fuel nozzles and opening to said burner port, and a bladed impeller at the discharge end of said fuel nozzles and having a circular series of obliquely extending blades extending substantially throughout the discharge areas of said inner and outer fuel nozzles.

7. Pulverized fuel burning apparatus comprising in combination means defining a furnace chamber having a burner port, a burner ring arranged in said burner port, a pulverized fuel burner comprising a cylindrical inner fuel nozzle having its discharge end concentric with said burner ring, a fuel inlet chamber having a volute-curved peripheral wall and a circular outlet connected to said fuel nozzle, a pulverized fuel inlet tangentially connected to said inlet chamber, a cylindrical outer fuel nozzle having its discharge end concentric with and radially spaced from said inner nozzle and having its discharge end extending into said burner ring beyond said inner nozzle, a second fuel inlet chamber having a volute-curved peripheral wall and a circular outlet connected to said outer fuel nozzle, a pulverized fuel inlet tangentially connected to said second inlet chamber, a wind box surrounding said fuel nozzles and opening to said burner ring, an air inlet to said wind box at one side of said fuel burners, and a series of angularly spaced curved partitions in said wind box around said fuel nozzles arranged to substantially uniformly distribute the entering air circumferentially relative to said burner ring.

8. Pulverized fuel burning apparatus comprising in combination means defining a furnace chamber having a burner port in its upper end, a burner ring arranged in said burner port, a pulverized fuel burner comprising a vertically arranged inner fuel nozzle having its lower end concentric with said burner ring, an upper fuel inlet chamber having a volute-curved peripheral wall and a circular bottom outlet connected to the upper end of said fuel nozzle, a pulverized fuel inlet tangentially connected to said inlet chamber, a vertically arranged outer fuel nozzle having its lower end concentric with and radially spaced from said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, and a wind box surrounding said fuel nozzles and opening to said burner ring.

9. Pulverized fuel burning apparatus comprising in combination means defining a furnace chamber having a burner port in its upper end, a burner ring arranged in said burner port, a pulverized fuel burner comprising a vertically arranged cylindrical inner fuel nozzle concentric with said burner ring, an upper fuel inlet chamber having a volute-curved peripheral wall and a circular bottom outlet connected to the upper end of said fuel nozzle, a pulverized fuel inlet tangentially connected to said inlet chamber, a vertically arranged cylindrical outer fuel nozzle concentric with and radially spaced from said inner nozzle and having its lower end extending into said burner ring below said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, a wind box surrounding said fuel nozzles and opening to said burner ring, an air inlet to said wind box at one side of said fuel burners, and a series of angularly spaced curved partitions in said wind box around said fuel nozzles arranged to substantially uniformly distribute the entering air circumferentially relative to said burner ring.

10. Apparatus for burning pulverized fuel at high rates of heat release comprising in combination means defining a furnace chamber of substantially cylindrical internal cross-section and having a concentric burner port in one end and a heating gas outlet adjacent its opposite end, the diameter of the discharge end of said burner port being at least one-third the diameter of the adjacent portion of said furnace chamber, a pulverized fuel burner comprising a cylindrical inner fuel nozzle concentric with said burner ring, a fuel inlet chamber having a volute-curved peripheral wall and a circular outlet connected to said fuel nozzle, a pulverized fuel inlet tangentially connected to said inlet chamber, a cylindrical outer fuel nozzle concentric with and radially spaced from said inner nozzle, a second fuel inlet chamber having a volute-curved peripheral wall and a circular outlet connected to said outer fuel nozzle, a pulverized fuel inlet tangentially connected to said second inlet chamber, and a wind box surrounding said fuel nozzles and opening to said burner ring.

11. Apparatus for burning pulverized fuel at high rates of heat release comprising in combination means defining a vertically arranged furnace chamber of substantially cylindrical internal cross-section and having a concentric burner port in its upper end and a heating gas outlet adjacent its lower end, the diameter of the discharge end of said burner port being at least one-third the diameter of the adjacent portion of said furnace chamber, a pulverized fuel burner comprising a vertically arranged cylindrical inner fuel nozzle concentric with said burner port, an upper fuel inlet chamber having a volute-curved peripheral wall and a circular bottom outlet connected to the upper end of said fuel nozzle, a pulverized fuel inlet tangentially connected to said inlet chamber, a vertically arranged cylindrical outer fuel nozzle concentric with and radially spaced from said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, and a wind box surrounding said fuel nozzles and opening to said burner port.

12. Apparatus for burning pulverized fuel at high rates of heat release comprising in combination means defining a vertically arranged furnace chamber of substantially cylindrical internal cross-section and having a concentric burner port in its upper end and a heating gas outlet adjacent its lower end, the diameter of the lower end of said burner port being at least one-third the diameter of the subjacent portion of said furnace chamber, a pulverized fuel burner comprising a vertically arranged cylindrical inner fuel nozzle concentric with said burner port, an upper fuel inlet chamber having a volute-curved peripheral wall and a circular bottom outlet connected to the upper end of said fuel nozzle, a pulverized fuel inlet tangentially connected to said inlet chamber, a vertically arranged cylindrical outer fuel nozzle concentric with and radially spaced from said inner nozzle and having its lower end extending into said burner ring below said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, a wind box surrounding said fuel nozzles and opening to said burner ring, a bladed impeller at the lower end of said fuel nozzles and having a circular series of obliquely extending blades extending substantially throughout the discharge area of said inner and outer fuel nozzles, and means permitting the withdrawal of said impeller through said outer fuel nozzle and lower inlet chamber.

13. Apparatus for burning pulverized fuel at high rates of heat release comprising in combination means defining a vertically arranged furnace chamber of substantially cylindrical internal cross-section and having a concentric burner port in its upper end and a heating gas outlet adjacent to its lower end, the diameter of the lower end of said burner port being at least one-third the diameter of the subjacent portion of said furnace chamber, a burner ring concentrically arranged in said burner port, a pulverized fuel burner comprising a vertically arranged cylindrical inner fuel nozzle concentric with said burner ring, an upper fuel inlet chamber having a volute-curved peripheral wall and a circular bottom outlet connected to the upper end of said fuel nozzle, a pulverized fuel inlet tangentially connected to said inlet chamber, a vertically arranged cylindrical outer fuel nozzle concentric with and radially spaced from said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, a wind box surrounding said fuel nozzles and opening to said burner ring, an air inlet to said wind box at one side of said fuel burners, and a series of angularly spaced curved partitions in said wind box around said fuel nozzles arranged to substantially uniformly distribute the entering air circumferentially relative to said burner ring.

14. Apparatus for burning pulverized fuel at high rates of heat release comprising in combination means defining a vertically arranged furnace chamber of substantially cylindrical internal cross-section and having a concentric burner port in its upper end and a heating gas outlet adjacent its lower end, the diameter of the lower end of said burner port being at least one-third the diameter of the subjacent portion of said furnace chamber, refractory covered water tubes lining said furnace chamber, a burner ring concentrically arranged in said burner port, a pulverized fuel burner comprising a vertically arranged cylindrical inner fuel nozzle concentric with said burner ring, an upper fuel inlet chamber having a volute-curved peripheral wall and a circular bottom outlet connected to the upper end of said fuel nozzle, a pulverized fuel inlet tangentially connected to said inlet chamber, a vertically arranged cylindrical outer fuel nozzle concentric with and radially spaced from said inner nozzle and having its lower end extending into said burner ring below said inner nozzle, a lower fuel inlet chamber having a volute-curved peripheral wall and a circular bottom outlet connected to the upper end of said outer fuel nozzle, a pulverized fuel inlet tangentially connected to said lower inlet chamber, a wind box surrounding said fuel nozzles and opening to said burner ring, an air inlet to said wind box at one side of said fuel burners, and a bladed impeller at the lower end of said fuel nozzles and having a circular series of obliquely extending blades extending substantially throughout the discharge area of said inner and outer fuel nozzles.

15. Pulverized fuel burning apparatus comprising in combination means defining a furnace chamber having a circular burner port in its upper end, a pulverized fuel burner comprising a vertically arranged fuel nozzle having its discharge end extending into in spaced concentric relation with said burner port, an inlet chamber having a volute-curved peripheral wall and a single circular bottom fuel outlet therein connected to the upper end of said fuel nozzle, a pulverized fuel inlet tangentially connected to said inlet chamber with its axis at a non-intersecting angle relative to the axis of said bottom outlet, a wind box surrounding said fuel nozzle and opening to said burner port, an air inlet opening at only one side of said wind box, and a series of fixed vertical partitions positioned in said wind box around said fuel nozzle and relatively spaced circumferentially of and progressively curved outwardly from said burner port to effect a substantially uniform distribution of the entering air circumferentially of said burner port and a whirling air stream downwardly through said burner port.

16. Pulverized fuel burning apparatus comprising in combination means defining a furnace chamber having a burner port in its upper end, a downwardly tapering burner ring arranged in said burner port, a pulverized fuel burner comprising a vertically arranged cylindrical fuel nozzle concentric with said burner ring, an inlet chamber having a volute-curved peripheral wall and a circular bottom outlet connected to the upper end of said fuel nozzle, a pulverized fuel inlet tangentially connected to said inlet chamber with its axis at right angles and non-intersecting relative to the axis of said bottom outlet, a wind box surrounding said fuel nozzle and opening to said burner ring, an air inlet to said wind box at only one side of said fuel burner, and a series of fixed vertical partitions positioned in said wind box around said fuel nozzle and relatively spaced circumferentially of and progressively curved outwardly from said burner ring to substantially uniformly distribute the entering air circumferentially of said burner ring and provide an air stream downwardly through said burner ring whirling counter to the direction of angular movement of the fuel discharged from said fuel nozzle.

17. Pulverized fuel burning apparatus comprising in combination means defining a furnace chamber of unobstructed cylindrical internal cross-section having a concentric burner port in one end and a heating gas outlet adjacent its opposite end, the diameter of the discharge end of said burner port being at least one third the diameter of the adjacent portion of said furnace chamber, a pulverized fuel burner comprising a fuel nozzle having its discharge end concentric with said burner port, an inlet chamber having a curved peripheral wall and a circular outlet connected to the inlet end of said fuel nozzle, a pulverized fuel inlet tangentially connected to said inlet chamber with its axis at right angles and non-intersecting relative to the axis of said circular outlet, a wind box surrounding said fuel nozzle and opening to said burner port, an air inlet opening only at one side of said wind box, and angularly spaced fixed curved partitions arranged to effect a substantially uniform distribution of the entering air circumferentially of said burner port.

18. Apparatus for burning pulverized fuel at high rates of heat release comprising in combination means defining a vertically arranged furnace chamber of cylindrical internal cross-section having a concentric burner port in its upper end and a heating gas outlet adjacent its lower end, the diameter of the lower end of said burner port being at least one third the diameter of the subjacent portion of said furnace chamber, a downwardly tapering frusto-conical burner ring concentrically arranged in said burner port, a pulverized fuel burner comprising a vertically arranged cylindrical fuel nozzle concentric with said burner ring, an inlet chamber having a volute-curved peripheral wall and a restricted circular bottom outlet connected to the upper end of said fuel nozzle, a pulverized fuel inlet tangentially connected to said inlet chamber, a wind box surrounding said fuel nozzle and opening to the upper end of said burner ring, an air inlet opening at only one side of said wind box, and angularly spaced progressively curved fixed vertical partitions in said wind box around said fuel nozzle and arranged to effect a substantially uniform distribution of the entering air circumferentially of said burner ring.

RALPH M. HARDGROVE.